US010442043B2

(12) United States Patent
Walton (10) Patent No.: US 10,442,043 B2
(45) Date of Patent: Oct. 15, 2019

(54) TORQUE TOOL, SOCKET SELECTION MECHANISM, AND METHODS OF USE

(71) Applicant: Forum Energy Technologies (UK) Limited, Aberdeen (GB)

(72) Inventor: Stephen Walton, Aberdeen (GB)

(73) Assignee: Forum Energy Technologies (UK) Limited, Aberdeen (GB)

( * ) Notice: Subject to any disclaimer, the term of this patent is extended or adjusted under 35 U.S.C. 154(b) by 195 days.

(21) Appl. No.: 15/116,692

(22) PCT Filed: Feb. 5, 2015

(86) PCT No.: PCT/GB2015/050323
§ 371 (c)(1),
(2) Date: Aug. 4, 2016

(87) PCT Pub. No.: WO2015/118335
PCT Pub. Date: Aug. 13, 2015

(65) Prior Publication Data
US 2016/0346883 A1    Dec. 1, 2016

(30) Foreign Application Priority Data

Feb. 5, 2014 (GB) .................................. 1401999.6

(51) Int. Cl.
*B23P 19/06* (2006.01)
*B25B 23/14* (2006.01)
(Continued)

(52) U.S. Cl.
CPC ........... *B23P 19/069* (2013.01); *B23P 19/065* (2013.01); *B25B 13/102* (2013.01); *B25B 23/14* (2013.01);
(Continued)

(58) Field of Classification Search
CPC .... B23P 19/069; B23P 19/065; B25B 13/102; B25B 21/00; B25B 23/14; B25B 23/1405; B63C 11/52; G05D 1/0011; E21B 41/04
See application file for complete search history.

(56) References Cited

U.S. PATENT DOCUMENTS

| 5,375,489 A * | 12/1994 | McClure ................. B25B 13/44 |
| | | 279/65 |
| 2005/0193869 A1* | 9/2005 | Ohtake ................. B25B 21/002 |
| | | 81/57.38 |
| 2012/0137837 A1* | 6/2012 | Souma ................. B25B 13/102 |
| | | 81/124.3 |

FOREIGN PATENT DOCUMENTS

WO    2004065068 A1    8/2004

OTHER PUBLICATIONS

TMT Smart Torque Tool MK2, Whole Page, Jan. 25, 2014.*
International Search Report and Written Opinion dated Sep. 30, 2015 for Application No. PCT/GB2015/050323.

* cited by examiner

*Primary Examiner* — Robert Scruggs
(74) *Attorney, Agent, or Firm* — Patterson + Sheridan, LLP (57) ABSTRACT

The invention provides a subsea torque tool (10) for a subsea vehicle system (such as an ROV), a drive head selection mechanism (30), and a method of use. The tool comprises a tool housing and a plurality of torque drive heads (22, 24, 26). The drive mechanism (17, 18, 20, 28) is operable to rotate the plurality of torque drive heads, and the drive head selection mechanism is used to select a drive head to impart a torque to a subsea device. The drive head selection mechanism comprises a rotary actuator (14, 32), and rotation of the rotary actuator effects axial movement of at least one of the plurality of drive heads between an operative position and an inoperative position. In another aspect, the drive head (Continued)

selection mechanism comprises an actuator operable from the exterior of the torque tool. In a preferred embodiment, the drive heads are sockets (22, 24, 26), and the selection mechanism comprises a rotary actuator and a cam mechanism. The at least one socket may be permitted to rotate with respect to the cam mechanism when a driving torque is applied to the torque sockets.

24 Claims, 7 Drawing Sheets

(51) Int. Cl.
*B25B 13/10* (2006.01)
*B63C 11/52* (2006.01)
*G05D 1/00* (2006.01)
*E21B 41/04* (2006.01)

(52) U.S. Cl.
CPC ............ *B63C 11/52* (2013.01); *G05D 1/0011* (2013.01); *E21B 41/04* (2013.01)

TORQUE TOOL, SOCKET SELECTION MECHANISM, AND METHODS OF USE

The present invention relates to a torque tool and a method of use, and in particular to a torque tool used in subsea applications for the actuation and operation of subsea equipment. Aspects of the invention relate to torque tools operable by subsea vehicles such as Remotely Operated Vehicles (ROVs). A particular aspect of the invention relates to a torque drive head selection mechanism for a subsea torque tool.

BACKGROUND TO THE INVENTION

Subsea torque tools are required to perform a range of tasks on subsea infrastructure and equipment, for example applying torque to actuate rotating components of valves, or to lockdown or release clamps on equipment for the oil and gas industry. Typically, these rotating components are designed to be actuated at a specific torque, and when required to rotate a subsea component, an operator of an ROV torque tool will choose the correct socket size and apply the appropriate torque so that the tool does not impart a torque greater than the maximum capability of the subsea component. The component may fail or become damaged if the torque applied to it by a torque tool is excessive. The retrieval of the subsea component for repair or replacement can be difficult and expensive.

The range of tasks that an ROV torque tool is required to perform means that the torque output of the tool must be changed depending on the torque requirements of the task. The changing of socket sizes on the ROV torque tool has previously been achieved by using external change-out modules to change between sockets of different sizes. However, this method can be cumbersome and time-consuming.

More recently, ROV torque tools have been developed in an effort to avoid relying on external change-out modules and to reduce the delays and costs involved in changing the gearbox and/or motor. These tools have spring-loaded nested sockets which can switch between sockets of different sizes, depending on the application.

However, spring loaded nested sockets have the disadvantage that when the torque tool socket is docked onto a subsea structure component, it is not clear which socket size is being used. If an incorrect socket size is used it may result in the wrong value of torque being applied to the subsea structure component and result in significant damage to the subsea structure and the torque tool.

SUMMARY OF THE INVENTION

It is an object of an aspect of the present invention to obviate or at least mitigate the foregoing disadvantages of prior art torque tools.

It is another object of an aspect of the present invention to provide a robust, reliable and compact torque tool suitable for deployment subsea which is capable of changing socket sizes quickly such that the correct torque can be reliably applied to a subsea structure component.

It is a further object of an aspect of the present invention to provide a torque tool with improved productivity or efficiency, or which is capable of reliably performing a range of tasks once deployed to a subsea worksite.

An additional aim of the invention is to provide a socket selection mechanism for a torque tool which is an alternative to previously proposed socket selection mechanisms, and/or a torque tool comprising such a mechanism.

Further aims of the invention will become apparent from the following description.

According to a first aspect of the invention there is provided a subsea torque tool comprising:
a tool housing;
a plurality of torque drive heads;
a drive mechanism operable to rotate the plurality of torque drive heads;
and a drive head selection mechanism for selecting a socket to impart a torque to a subsea device;
wherein the drive head selection mechanism comprises a rotary actuator, and wherein rotation of the rotary actuator effects axial movement of at least one of the plurality of drive heads between an operative position and an inoperative position.

The above-described subsea torque tool may facilitate changing between a plurality of torque drive heads quickly such that the correct torque can be reliably applied to a subsea structure component. This may also prevent significant damage to the subsea structure due to the application of an incorrect torque value.

By providing a subsea torque tool which is capable of switching between torque drive heads of different sizes and/or shape profiles the tool is capable of being utilised in a wide range of tasks. This increases the productivity and efficiency of tasks to be performed at a subsea worksite.

Preferably the torque tool is a subsea torque tool.

The subsea torque tool may be any type of torque tool suitable to apply a torque to a subsea structure component. Preferably, the torque tool is a torque tool for a subsea vehicle system, which may comprise a Remotely Operated Vehicle, or may comprise an Autonomous Underwater Vehicle (AUV).

The drive head may be any drive head suitable to apply a torque to a rotatable component of a subsea structure. Preferably the drive heads comprise sockets, and more preferably the sockets may have a range of sizes and/or shape profiles.

Preferably the drive heads comprise a plurality of nested sockets.

Preferably the sockets sizes and/or profiles correspond with a rotatable component of a subsea structure Preferably the arrangement of nested sockets is surrounded by a nose cone.

The actuator may be a hydraulic, pneumatic, electric or mechanical actuator. In some embodiments, the actuator is a mechanical actuator and the actuator may be a rotary actuator.

The actuator may be operable remotely. The actuator may be operable from the exterior of the torque tool.

The rotating actuator may be operable by rotation of the nose cone. The nose cone may be configured to be rotated by a standard ROV torque tool bucket.

The tool may comprise latching wings to secure the tool to the subsea structure interface, which may ensure the socket reliably engages with the rotating component of the subsea structure. Preferably the latching wings are hydraulically driven forward. The latching wings may be spring retractable.

The sockets may be rotationally keyed to one another.

The drive head selection mechanism further comprise a cam mechanism. In some embodiments, the cam mechanism may translate rotary movement of the actuator to axial movement of at least one of the plurality of drive heads between an operative position and an inoperative position.

The drive head selection mechanism may comprise at least one drive head guide which couples the at least one drive head to the cam mechanism. The at least one drive head may be configured to rotate with respect to the cam mechanism during operation of the driving mechanism to impart a torque to an operative drive head.

In one embodiment, rotation of the nose cone in a first direction may effect axial movement of at least one of the plurality of drive heads between an operative position and an inoperative position. Rotation of the nose cone in a second direction may effect axial movement of at least one of the plurality of drive heads between an inoperative position and an operative position.

According to a second aspect of the invention there is provided a torque tool comprising:
  a tool housing;
  a plurality of torque drive heads;
  a drive mechanism operable to rotate the plurality of torque drive heads;
  and a drive head selection mechanism for selecting a socket to impart a torque to a subsea device;
  wherein the drive head selection mechanism comprises a rotary actuator, and wherein rotation of the rotary actuator effects axial movement of at least one of the plurality of drive heads between an operative position and an inoperative position.

The subsea torque tool may facilitate selecting between sockets of different sizes and/or shape profiles. This may have the benefit of reducing the time required to attend to a wide range of tasks subsea and may avoid the need to return to the surface to change tool or socket size and/or shape profiles.

Preferably the torque tool is a subsea torque tool.

The drive heads may comprise a plurality of nested sockets.

The rotary actuator may be operable remotely. The actuator may be operable from the exterior of the torque tool.

The arrangement of nested sockets may be surrounded by a nose cone.

The rotating actuator may be operable by rotation of the nose cone. The nose cone may be rotated in a standard ROV bucket.

The tool may comprise latching wings to secure the tool to the subsea structure interface, which may ensure the socket reliably engages with the rotating component of the subsea structure. Preferably the latching wings are hydraulically driven forward. The latching wings may be spring retractable.

Preferably the nested sockets may be rotationally keyed to one another.

Preferably the drive head selection mechanism may further comprise a cam mechanism. In some embodiments, the cam mechanism may translate rotary movement of the actuator to axial movement of at least one of the plurality of drive heads between an operative position and an inoperative position.

In one embodiment rotation of the nose cone in a first direction may effect axial movement of at least one of the plurality of drive heads between an operative position and an inoperative position. Rotation of the nose cone in a second direction may effect axial movement of at least one of the plurality of drive heads between an inoperative position and an operative position.

Embodiments of the second aspect of the invention may include one or more features of the first aspect of the invention or its embodiments, or vice versa.

According to a third aspect of the invention there is provided a subsea torque tool comprising:
  a tool housing;
  a plurality of torque drive heads;
  a drive mechanism operable to rotate the plurality of torque drive heads;
  and a drive head selection mechanism for selecting a socket to impart a torque to a subsea device;
  wherein the drive head selection mechanism comprises an actuator operable from the exterior of the torque tool, and wherein the actuator effects axial movement of at least one of the plurality of drive heads between an operative position and an inoperative position.

The actuator may be a hydraulic, pneumatic, electric or mechanical actuator. In some embodiments, the actuator is a mechanical actuator and the actuator may be a rotary actuator.

In one embodiment, rotation of the rotary actuator in a first direction effects axial movement of at least one of the plurality of drive heads between an operative position and an inoperative position. Rotation of the rotary actuator in a second direction may effect axial movement of at least one of the plurality of drive heads between an inoperative position and an operative position.

The rotary actuator may be operable remotely. The rotating actuator may be operable by rotation of a nose cone. The nose cone may be rotated by a standard ROV torque tool bucket.

The drive heads may comprise sockets, and may comprise a plurality of nested sockets.

Preferably the nested sockets are rotationally keyed to one another.

The drive head selection mechanism may further comprise a cam mechanism. In some embodiments, the cam mechanism may translate rotary movement of the actuator to axial movement of at least one of the plurality of drive heads between an operative position and an inoperative position.

Embodiments of the third aspect of the invention may include one or more features of the first or second aspect of the invention or their embodiments, or vice versa According to a fourth aspect of the invention there is provided a subsea torque tool comprising:
  a tool housing;
  a plurality of torque drive heads;
  a drive mechanism operable to rotate the plurality of torque drive heads;
  and a drive head selection mechanism for selecting a socket to impart a torque to a subsea device;
  wherein the drive head selection mechanism comprises a rotary actuator, and a cam mechanism which translates rotary movement of the actuator to axial movement of at least one of the plurality of drive head between an operative position and an inoperative position;
  wherein the at least one drive head is permitted to rotate with respect to the cam mechanism when a driving torque is applied to the torque drive heads.

Preferably the drive head selection mechanism comprises at least one drive head guide which couples the at least one drive head to the cam mechanism, and which permits the at least one drive head to be rotated with respect to the cam mechanism during operation of the driving mechanism to impart a torque to an operative drive head.

In some embodiments, the at least one drive head is configured to rotate with respect to the cam mechanism during operation of the driving mechanism to impart a torque to an operative drive head.

Preferably the drive heads comprise sockets, and more preferably comprise a plurality of nested sockets. The nested sockets may be rotationally keyed to one another.

The arrangement of nested sockets may be surrounded by a nose cone.

The rotating actuator may be operable by rotation of the nose cone. The nose cone may be rotated in a standard ROV torque tool bucket.

Embodiments of the fourth aspect of the invention may include one or more features of the first to third aspects of the invention or their embodiments, or vice versa According to a fifth aspect of the invention there is provided a drive head selection mechanism for a torque tool;

the drive head selection mechanism comprising an actuator, and a cam mechanism to move at least one of a plurality of drive heads between an operative position and an inoperative position;

wherein the at least one drive head is configured to rotate with respect to the cam mechanism when a driving torque is applied to the torque drive heads.

Preferably the torque tool is a subsea torque tool.

The drive heads may be any drive heads suitable to apply a torque to a rotatable component of a subsea structure. Preferably the drive heads comprise sockets, and more preferably the sockets may have a range of sizes and/or shape profiles.

The cam mechanism may translate rotary movement of the actuator to axial movement of at least one of the plurality of drive heads between an operative position and an inoperative position.

Embodiments of the fifth aspect of the invention may include one or more features of the first to fourth aspects of the invention or their embodiments, or vice versa.

According to a sixth aspect of the invention there is provided a drive head selection mechanism for a subsea torque tool;

the drive head selection mechanism comprising a rotary actuator, and a cam mechanism which translates rotary movement of the actuator to axial movement of at least one of a plurality of drive heads between an operative position and an inoperative position;

wherein the at least one drive head is permitted to rotate with respect to the cam mechanism when a driving torque is applied to the torque drive heads.

Preferably the drive heads comprise sockets, and more preferably comprise a plurality of nested sockets.

Embodiments of the sixth aspect of the invention may include one or more features of the first to fifth aspects of the invention or their embodiments, or vice versa.

According to a seventh aspect of the invention there is provided a method of operating a subsea torque tool comprising providing a subsea torque tool comprising a tool housing; a plurality of torque drive heads;

a drive mechanism operable to rotate the plurality of torque drive heads; and a drive head selection mechanism comprising an actuator;

rotating the actuator to effect axial movement of at least one of the plurality of drive heads between an operative position and an inoperative position.

The method may comprise rotating the rotary actuator to effect axial movement of at least one of the plurality of drive heads between an operative position and an inoperative position.

The method may comprise actuating the actuator from the exterior of the torque tool.

The method may comprise securing the tool to the subsea structure interface.

Embodiments of the seventh aspect of the invention may include one or more features of the first to sixth aspects of the invention or their embodiments, or vice versa.

According to an eighth aspect of the invention there is provided a method of operating a subsea torque tool or drive head selection mechanism according to a previous aspect of the invention.

Embodiments of the eighth aspect of the invention may include one or more features of the first to seventh aspects of the invention or their embodiments, or vice versa.

According to a ninth aspect of the invention there is provided a subsea vehicle system comprising a torque tool according to any previous aspect of the invention.

Embodiments of the ninth aspect of the invention may include one or more features of the first to eighth aspects of the invention or their embodiments, or vice versa.

According to yet further aspects of the invention, there is provided a subsea torque tool, a drive head selection mechanism for a subsea torque tool and method of operating a subsea torque tool or drive head selection mechanism as herein described with reference to the appended drawings.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

Figure 1A:
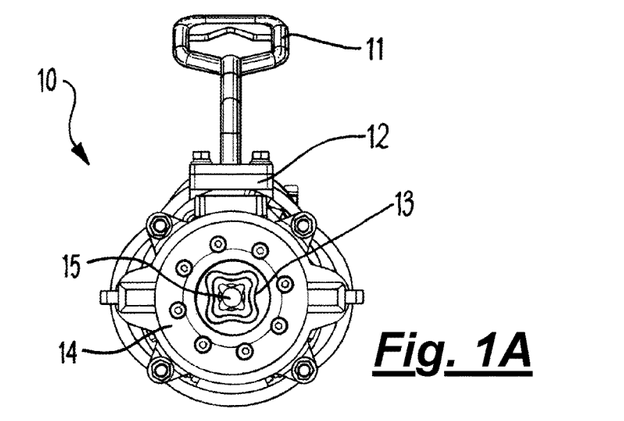
FIGS. 1A, 1B and 1C are respectively front, plan and side views of a torque tool according to an embodiment of the invention.
Figure 1B:
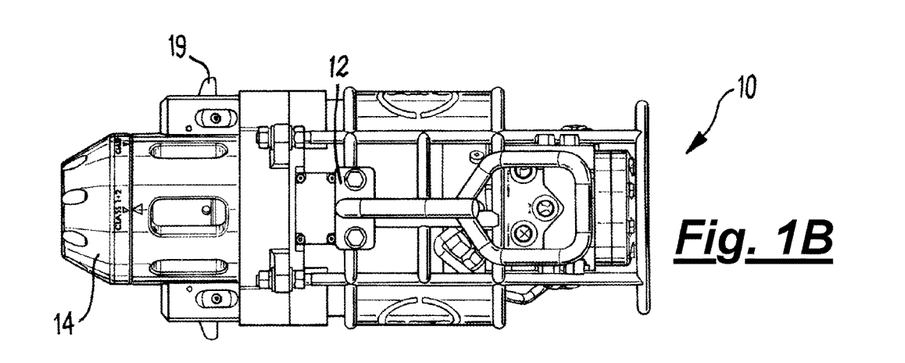
Figure 1C:
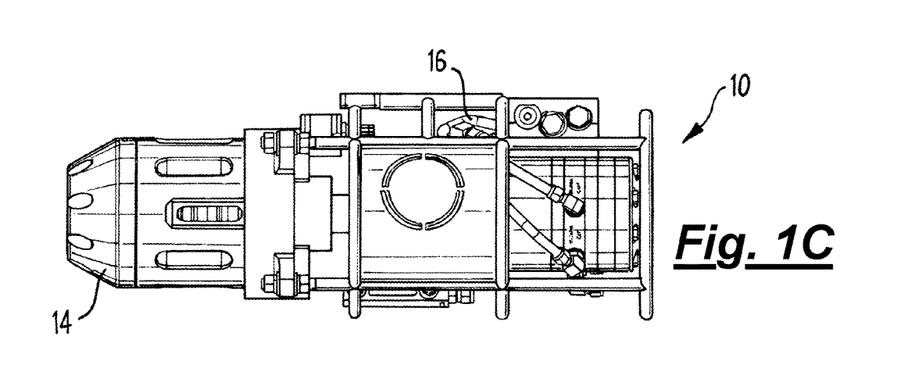

FIGS. 1A, 1B and 1C show a torque tool 10 according to a first embodiment of the invention, shown from front, plan and side views respectively. The tool 10 is configured to apply a torque to a rotatable component of a subsea structure. The tool 10 has a handle 11 attached to the main body 12. At one end of the tool 10 is a rotatable socket assembly 13 surrounded by a nose cone 14. The socket assembly 13 is connected to a drive shaft 15 which is driven by a motor assembly 16, which in this embodiment is a gerotor type of hydraulic motor. The sockets are drive heads for this particular torque tool, although it will be appreciated that the principles of the invention extend to other drive head types.

The socket assembly 13 is designed to engage with a rotatable component of a subsea structure. Wing members 19 engage the subsea structure to hold the tool onto the interface and lock the tool into position. The motor assembly generates an output torque which is transferred to the socket assembly 13 by the drive shaft 15 to turn the rotatable component.

Figure 2:
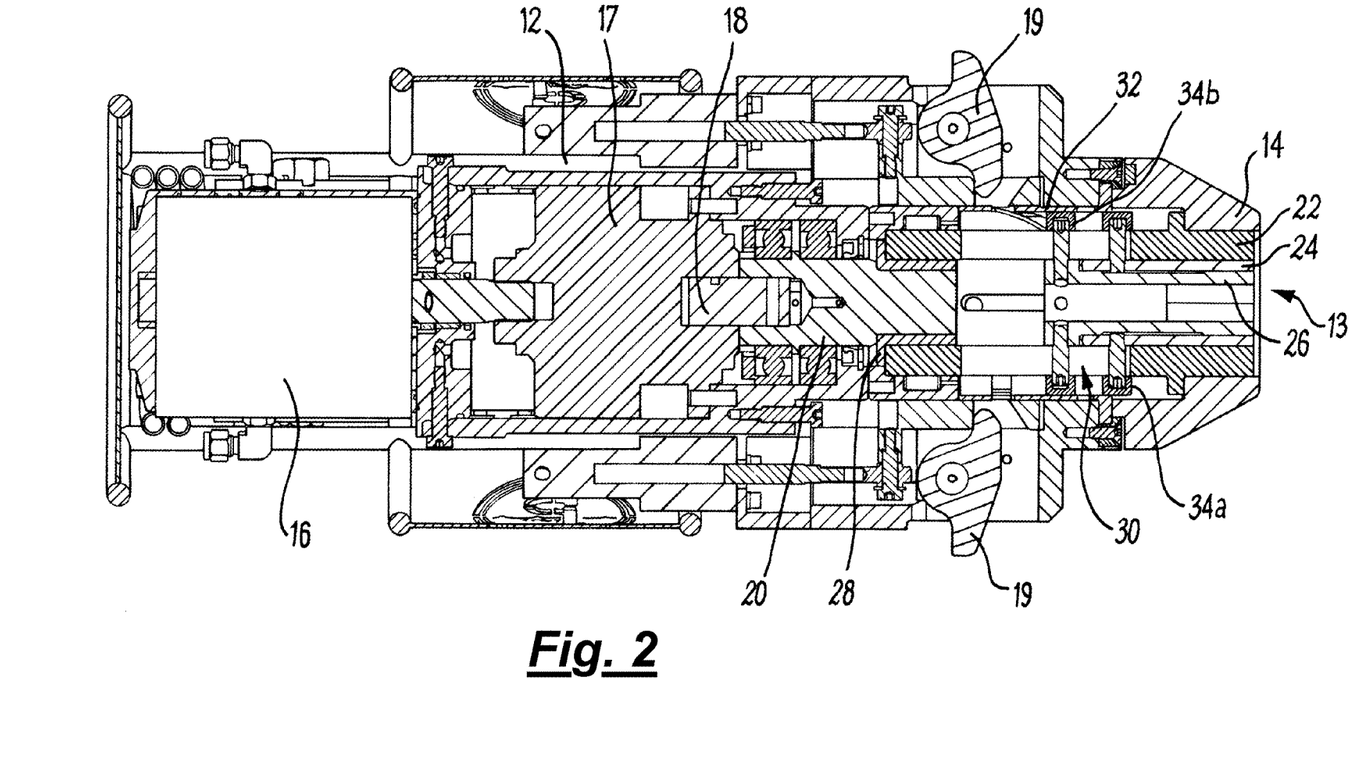
FIG. 2 is a longitudinal section through the torque tool of FIGS. 1A to 1C.

FIG. 2 is a longitudinal section through the torque tool 10 of FIGS. 1A to 1C, and shows the main body 12, the nose cone 14, and the socket assembly 13, coupled to the motor assembly 16 via a gearbox 17 and an output shaft assembly 18, 20.

Figure 3:
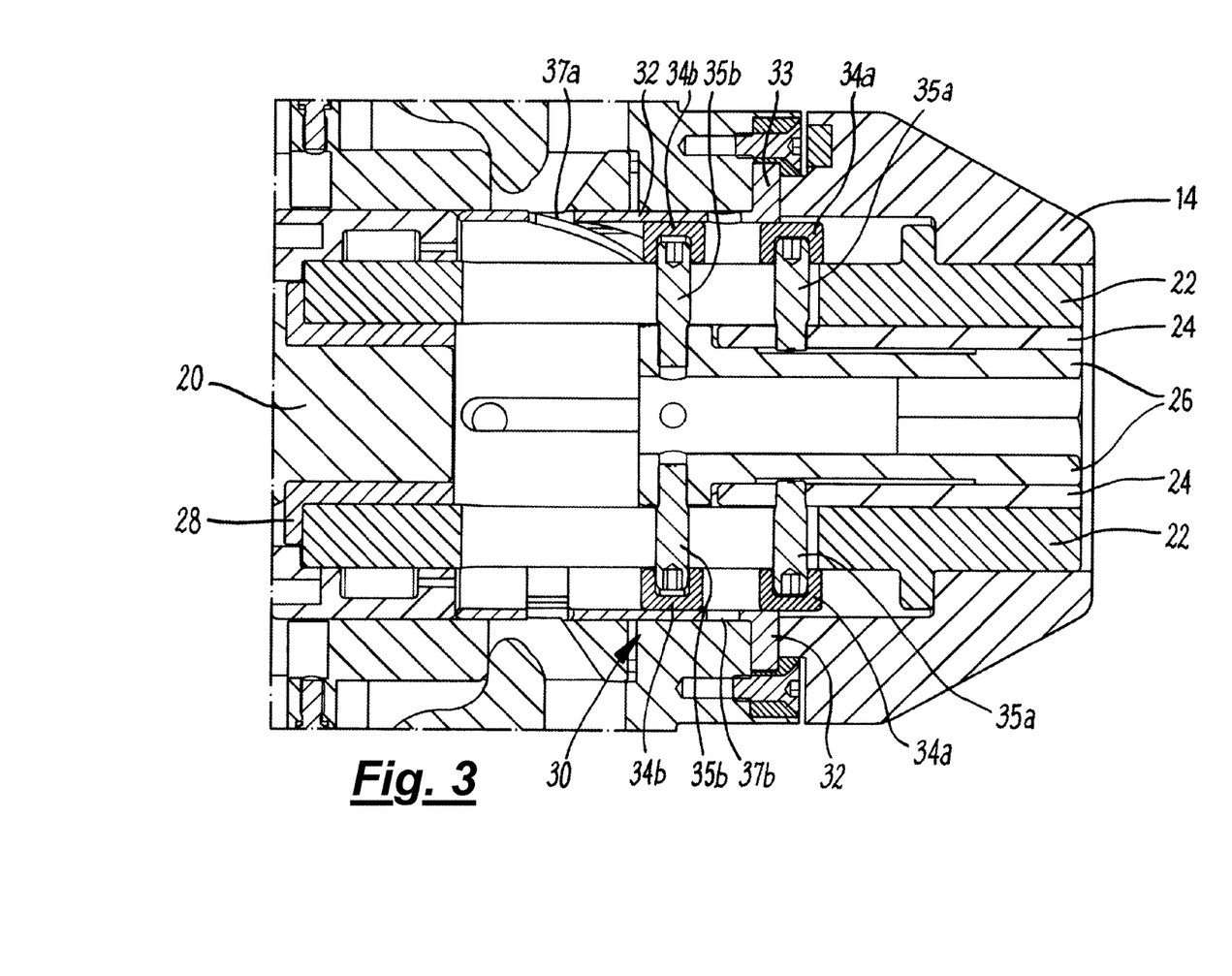
FIG. 3 is an enlarged cross-sectional of the socket assembly of the torque tool of FIGS. 1 and 2.

FIG. 3 is an enlarged cross-sectional view of the socket assembly 13. The socket assembly 13 comprises an arrangement of nested sockets surrounded by the nose cone 14. In this case three sockets 22, 24, and 26 are provided. The nested sockets are rotationally keyed to one another, and are driven via the connection of the outer socket 22 to the output shaft assembly 18, 20 via the output shaft socket 28. Outer socket 22 is axially fixed within the tool 10, whereas middle socket 24 and inner socket 26 are operable to move axially between operative and inoperative conditions. In FIGS. 2 and 3, the sockets 24 and 26 are in their outermost (extended) position level with the front face of the socket assembly. This means that the aperture created by the socket assembly 13 is the aperture defined by the inner socket, and the inner socket will therefore be operative when the sockets are driven to apply a torque.

The tool 10 also comprises a socket selection mechanism, generally depicted at 30 comprising an outer housing 32, a pair of socket guides 34a, 34b, and corresponding pins 35a and 35b. The outer housing 32 comprises an arrangement of slots, shown generally at 37, which define a cam mechanism. The socket selection mechanism 30 and its various components will be described in more detail with reference to FIGS. 4 to 7 below.

Figure 4A:
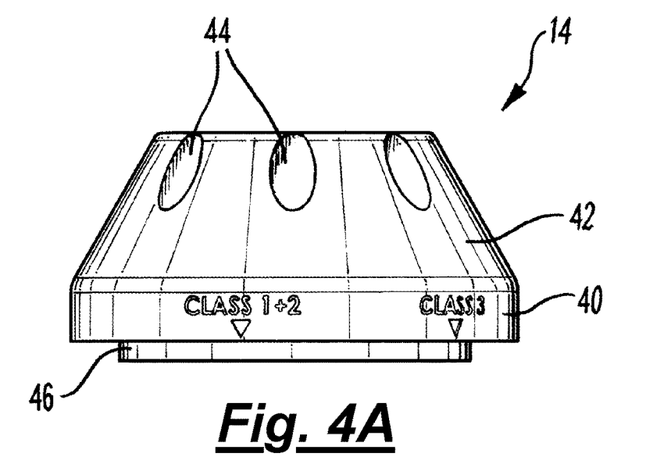
FIGS. 4A and 4B are respectively in side and perspective views of a nose cone of the torque tool of FIGS. 1 and 2.
Figure 4B:
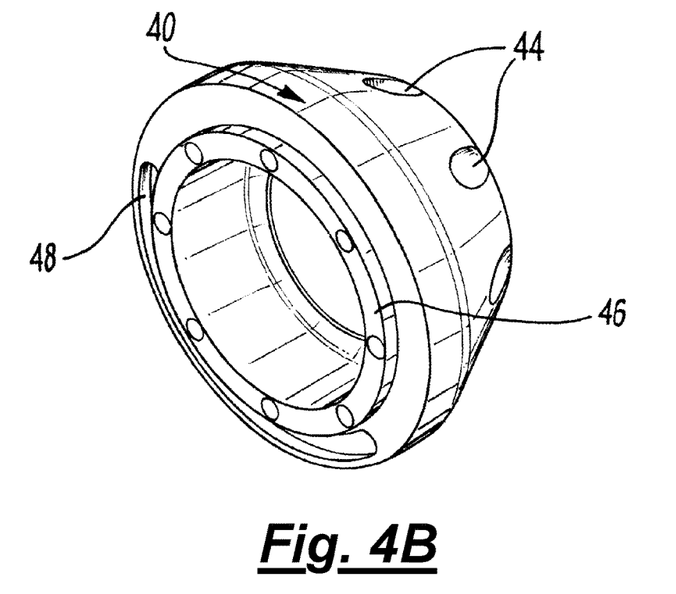

FIGS. 4A and 4B show generally at 14 the nose cone of the torque tool 10 respectively in side and perspective views. The nose cone 14 comprises a body having a cylindrical portion 40 and a frusto-conical portion 42. The body defines a throughbore which is sized to accommodate the socket assembly 13 when assembled in the tool 10. An end of the nose cone 14 which faces the tool comprises a support section 46 which extends axially beyond the widest part of the cylindrical portion 40, and has a reduced diameter relative to the cylindrical portion. The support section 46 provides an abutment face for the outer housing 32 when assembled in the tool 10. Bores 44 extend through the nose cone and align with corresponding bores in the outer housing 32 for the placement of bolts to secure the nose cone 14 with the outer housing. The nose cone 14 is therefore rotationally keyed with the outer housing 32.

The nose cone 14 is sized and shaped to fit into and engage with a standard ROV bucket to enable the nose cone to be rotated in the torque tool 10. When assembled with the tool an arcuate slot 48 in the facing end of the nose cone receives a pin which is secured to the main body of the tool 10 and prevents rotation of the nose cone 14 beyond preset limits.

Markings are provided on the exterior of the cylindrical portion 40 to indicate visibly the position of the nose cone and which socket has been selected to be operative.

Figure 5A:
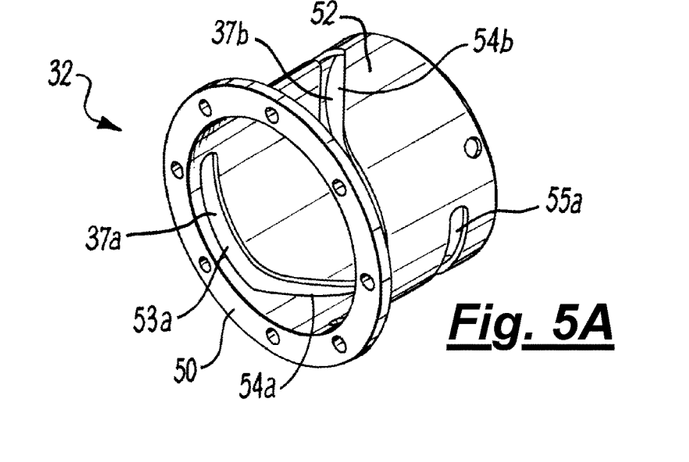
FIGS. 5A to 5C are respectively front perspective, rear perspective and side views of the outer housing of the torque tool of FIGS. 1 and 2.
Figure 5B:
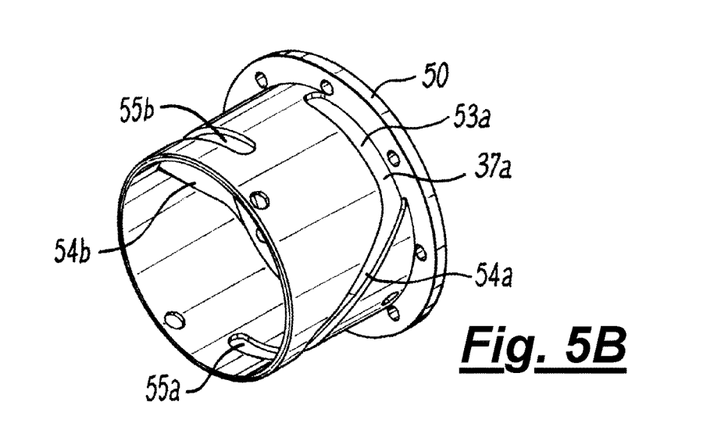
Figure 5C:
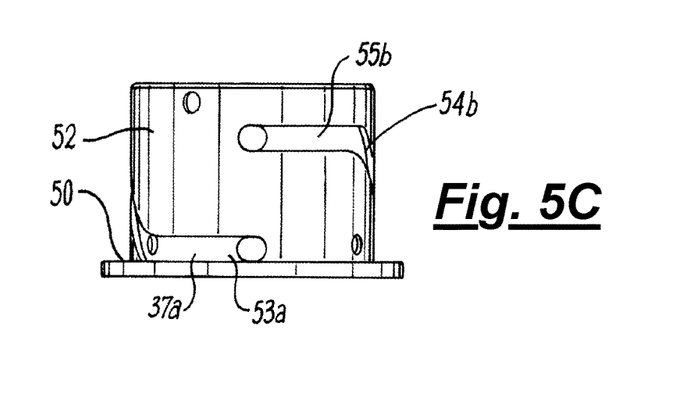

Referring now to FIGS. 5A to 5C, there is shown the outer housing 32 from front perspective, rear perspective and side views respectively. The outer housing 32 comprises a main cylindrical body 52 which defines a throughbore to accommodate the socket assembly 13. A lip 50 extends outwardly from an outer end of the outer housing 32.

The main body of the outer housing comprises a pair of shaped slots 37a, 37b which provide a cam mechanism for the movement of the sockets. The slots in the pair define a guide path for the retraction and extension of the sockets in the assembly between an operative and an inoperative condition. The slots mirror one another so that diametrically opposite each point of one slot 37 is a point in the other slot which is in the same axial plane (the same plane which is perpendicular to the longitudinal axis of the housing). Each slot 37a, 37b comprises a first part 53a, 53b which provides a guide at the same axial position in the housing close to the outer end of the housing; a second part 54a, 54b which provide a helical path in the housing; and a third part 55a, 55b which provides a provides a guide at the same axial position in the housing close to the inner end of the housing.

Figure 6A:
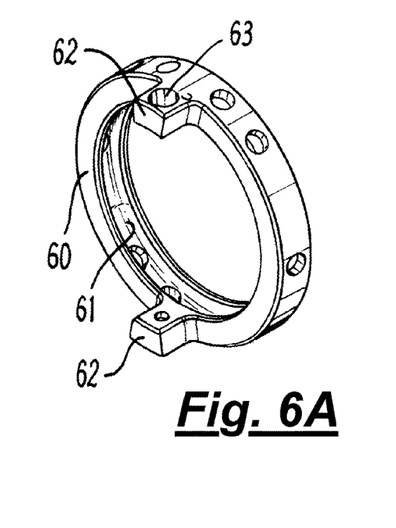
FIGS. 6A to 6C are respectively front perspective, rear perspective and sectional views of the socket guides of the torque tool of FIGS. 1 and 2.
Figure 6B:
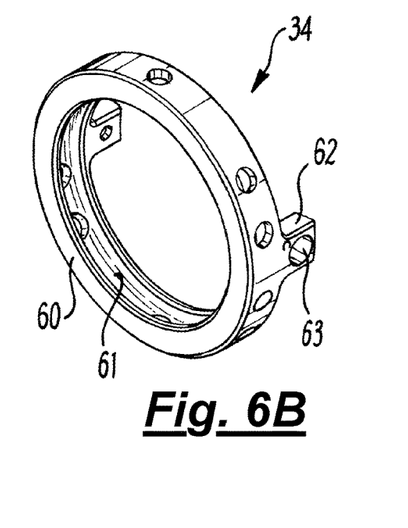
Figure 6C:
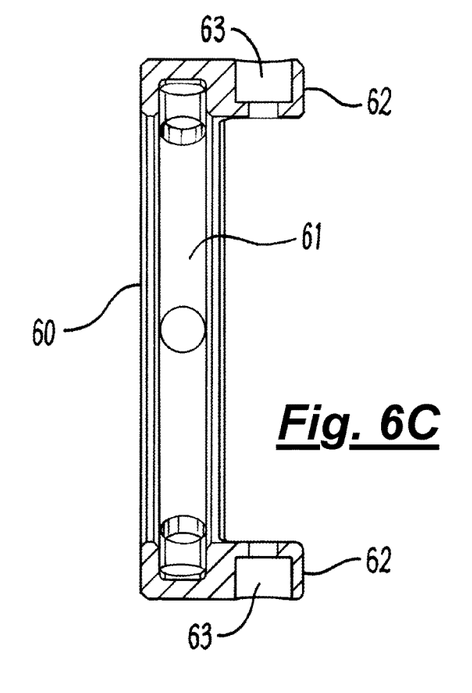

The slots 37 in the housing 32 are configured to receive pins which engage with socket guides 34, shown in more detail in FIGS. 6A to 6C. In the tool 10, two identical socket guides 34 are provided (34a, 34b). The socket guide 34 comprises a ring 60 defining a throughbore, with a pair of diametrically opposed tabs 62 which extend axially from the ring in the same direction as one another. The outer surface of each tab 62 is provided with a recess 63 configured to receive and secure a pin (39, FIGS. 7A and 7B). The pin is sized and shaped to be received in the slots 37 of the cam mechanism of the outer housing 32.

In the inside surface of the ring 60 is provided with a groove 61 which defines an annular path around the ring within the socket guide. The groove 61 is sized and shaped to receive pins 35a, 35b which couple the socket guide to a socket 24 or 26.

Figure 7A:
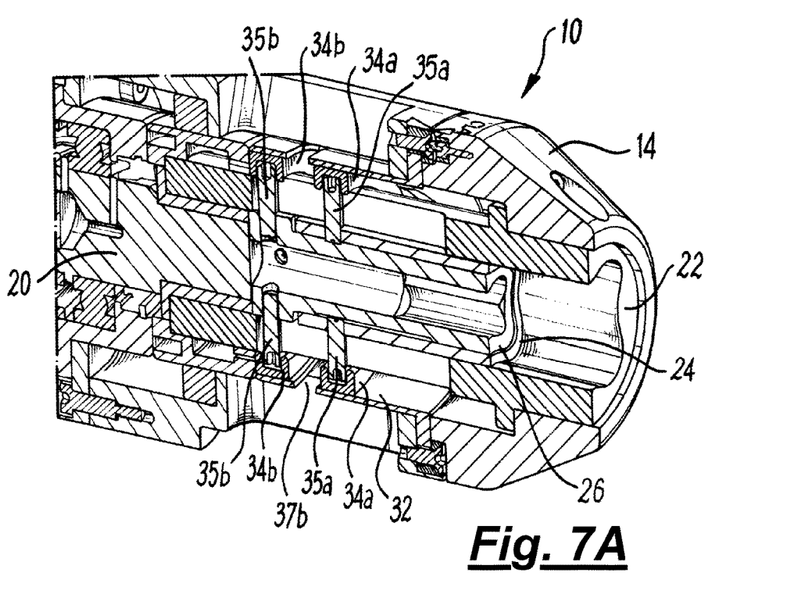
FIGS. 7A and 7B are perspective cut-away views of the socket selection mechanism of the torque tool of FIGS. 1 and 2.
Figure 7B:
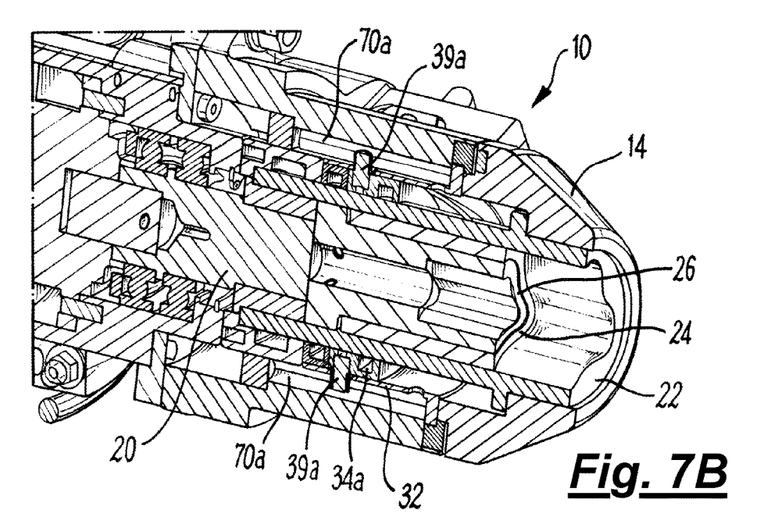

FIGS. 7A and 7B are perspective cut-away views of the socket selection mechanism of the torque tool 10. The Figures show the middle socket 24 and the inner socket 26 retracted into the tool body away from the face of the socket assembly. Consequently the aperture defined by the socket assembly 13 is that of the outer socket 22. As most clearly shown in FIG. 7A in conjunction with FIGS. 2 and 3, the middle and inner sockets are axially secured to the socket guides 34a, 34b respectively by pins 35a, 35b, which are located in the grooves 61 of the socket guides. The sockets are free to rotate with respect to the socket guides as the pins 34a, 34b run freely in the grooves 61. As most clearly shown in FIG. 7B, the tabs 62 of the socket guide 34a are secured to the outer housing 32 by pins 39a which are received into the slots 37. The pins 39a are free to move in the slots 37. Pins 39a are retained axially in a linear slot 70a in the housing, which defines a linear guide pathway for the retraction and extension of the sockets in the assembly between their operative and inoperative conditions.

Although not shown in FIG. 7B, socket guide 34b is similarly secured to the outer housing by pins 39b located in its tabs 62. Pins 39b are retained axially in a linear slot in the housing, which defines a linear guide pathway for the retraction and extension of the sockets in the assembly between their operative and inoperative conditions. The tabs and pins of the socket guide 34b are rotationally offset with respect to the pins and tabs of the socket guide 34a to enable sequential selection of the sockets by progressive rotation.

The functionality of the socket selection mechanism will now be described with reference to the foregoing drawings.

In use, the torque tool is located subsea at a work site and the torque application requirements determine which socket is selected by the operator. By rotating the nose cone 14 in a standard ROV bucket, the socket selection mechanism is moved to one of three operating positions: all sockets in their outermost positions, rendering the inner socket the operative socket; the inner socket retracted rendering the middle socket the operative socket; or the inner and middle sockets retracted rendering the outer socket the operative socket.

Rotation of the nose cone causes the outer housing 32 to be rotated in the tool 10. Rotation of the outer housing 32 causes the pins 39 to move in the slots 37, and as they move into the helical part 54 of the slot, the rotational movement of the housing is translated to an axial movement of the pins 39 and the socket guide 34 into which they are fixed. The socket guide transfers the axial force to the respective socket, causing it to be moved axially in the tool between an operative and inoperative (retracted position).

The slots 37 and the positions of the pins 39a, 39b and tabs of the socket guides are rotationally offset so that the socket guide 34b of the inner socket is first engaged by the helical part 54 of the cam slot. During retraction of the inner socket the pins of the socket guide 34a remain in the first part of the cam slot 37 and are not retracted. Further rotation of the outer housing causes the pins of the socket guide 34a to move into the helical part of the cam slot, resulting in retraction of the middle socket. This phase of rotation does not affect the inner socket and the socket guide 34b, as it is located in the third part of the cam slot and does not experience an axial force. Rotation of the nose cone 14 and the outer housing in the opposite sense causes axial movement of the middle socket and inner socket in the reverse sequence.

Importantly, the socket guide 34 isolates the rotation of the selection mechanism of the tool from rotation of the tool sockets themselves at all times. This means that when driven, the sockets are free to rotate within their socket guides. However, regardless of the rotational position of the sockets within the tool, an axial force experienced by the socket guide will be transferred to the socket.

It will be appreciated that a greater or lesser number of drive heads may be used in tools according to alternative embodiments of the invention.

The invention provides a subsea torque tool, a drive head selection mechanism, and a method of use. The tool comprises a tool housing and a plurality of torque drive heads. The drive mechanism is operable to rotate the plurality of torque drive heads, and the drive head selection mechanism is used to select a drive head to impart a torque to a subsea device. The drive head selection mechanism comprises a rotary actuator, and rotation of the rotary actuator effects axial movement of at least one of the plurality of drive heads between an operative position and an inoperative position. In another aspect, the drive head selection mechanism comprises an actuator operable from the exterior of the torque tool. In a preferred embodiment, the drive heads are sockets, and the selection mechanism comprises a rotary actuator and a cam mechanism. The at least one socket may be permitted to rotate with respect to the cam mechanism when a driving torque is applied to the torque sockets.

The present invention obviates or at least mitigates disadvantages of prior art torque tools and provides a robust, reliable and compact torque tool suitable for deployment subsea. The invention enables changing of socket sizes quickly such that the correct torque can be reliably applied to subsea structure component. The resulting torque tool has improved productivity and efficiency, and is capable of reliably performing a range of tasks once deployed to a subsea worksite.

Various modifications to the above described embodiments may be made within the scope of the invention herein intended.

The invention claimed is:

1. A subsea torque tool comprising:
   a tool housing;
   a plurality of torque drive heads;
   a drive mechanism operable to rotate the plurality of torque drive heads; and
   a drive head selection mechanism for selecting a socket to impart a torque to a subsea device;
   wherein the drive head selection mechanism comprises a rotary actuator, and wherein rotation of the rotary actuator effects axial movement of at least one of the plurality of drive heads between an operative position and an inoperative position.

2. The torque tool according to claim 1, wherein the drive heads comprise sockets.

3. The torque tool according to claim 2, wherein the drive heads comprise a plurality of nested sockets.

4. The torque tool according to claim 1, wherein the drive heads are surrounded by a nose cone.

5. The torque tool according to claim 4, wherein the actuator is operable by rotation of the nose cone.

6. The torque tool according to claim 4, wherein the nose cone is operable to be rotated by a standard remotely operated vehicle (ROV) torque bucket.

7. The torque tool according to claim 1, wherein the actuator is operable remotely.

8. The torque tool according to claim 1, wherein the actuator is operable from the exterior of the torque tool.

9. The torque tool according to claim 1, wherein the drive heads are rotationally keyed to one another.

10. The torque tool according to claim 1, wherein the drive head selection mechanism further comprises a cam mechanism.

11. The torque tool according to claim 10, wherein the cam mechanism is configured to translate rotary movement of the actuator to axial movement of at least one of the plurality of drive heads between an operative position and an inoperative position.

12. The torque tool according to claim 10, wherein the drive head selection mechanism comprises at least one drive head guide which couples the at least one drive head to the cam mechanism.

13. The torque tool according to claim 12, wherein the at least one drive head is configured to rotate with respect to the cam mechanism during operation of the driving mechanism to impart a torque to an operative drive head.

14. A subsea vehicle system comprising the torque tool according to claim 1.

15. The subsea vehicle system of claim 14, comprising a Remotely Operated Vehicle (ROV).

16. A drive head selection mechanism for a subsea torque tool, the drive head selection mechanism comprising:
    a plurality of drive heads;
    an actuator; and
    a cam mechanism which translates rotary movement of the actuator to axial movement of at least one of a plurality of drive heads between an operative position and an inoperative position;
    wherein the at least one drive head is configured to rotate with respect to the cam mechanism when a driving torque is applied to the torque drive heads.

17. The drive head selection mechanism according to claim 16, wherein the plurality of drive heads comprises a plurality of nested sockets.

18. The drive head selection mechanism according to claim 16, wherein the plurality of drive heads are rotationally keyed to one another.

19. The drive head selection mechanism according to claim 16, wherein the actuator is a rotary actuator.

20. The drive head selection mechanism according claim 19, wherein the plurality of drive heads is surrounded by a nose cone and the actuator is operable by rotation of the nose cone.

21. The drive head selection mechanism according to claim 16, wherein the actuator is configured to be operable from the exterior of the torque tool.

22. A method of operating a subsea torque tool, the method comprising:
   providing a subsea torque tool comprising a tool housing; a plurality of torque drive heads; a drive mechanism operable to rotate the plurality of torque drive heads; and a drive head selection mechanism comprising an actuator;
   rotating the actuator to effect axial movement of at least one of the plurality of drive heads between an operative position and an inoperative position.

23. The method according to claim 22, comprising rotating the actuator from the exterior of the torque tool.

24. The method according to claim 22, comprising operating driving mechanism to impart a torque to an operative drive head.

* * * * *